May 3, 1932.  A. A. THOMAS  1,856,600
THERMOSTAT
Filed March 26, 1927   2 Sheets-Sheet 2
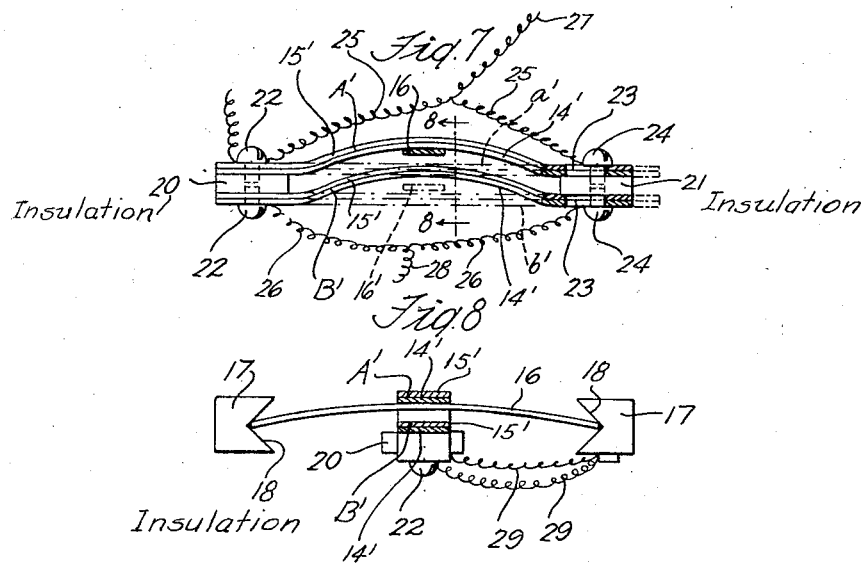
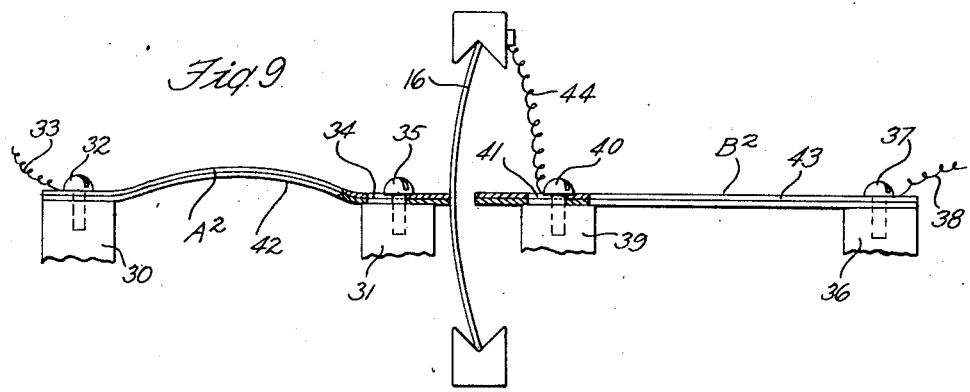
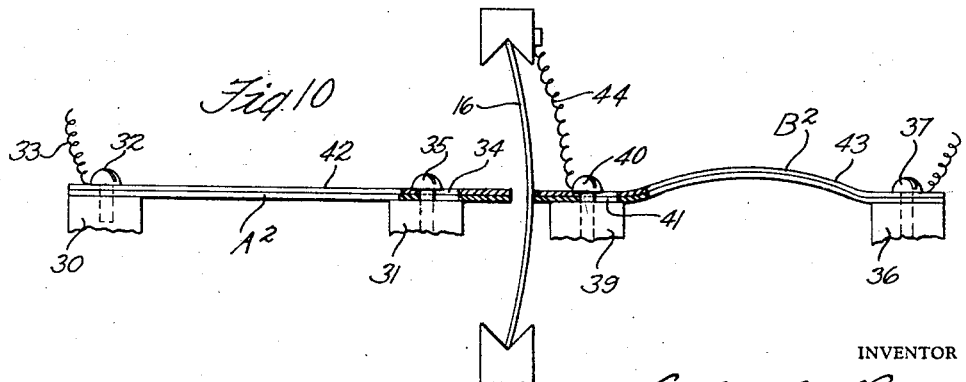
INVENTOR
Adolph A. Thomas Patented May 3, 1932

1,856,600

UNITED STATES PATENT OFFICE

ADOLPH A. THOMAS, OF NEW YORK, N. Y.

THERMOSTAT

Application filed March 26, 1927. Serial No. 178,638.

My invention is for a new and improved thermostat capable of operating with a snap action for opening and closing an electric circuit or performing any other intended function. The thermostat of my invention is characterized by simplicity and ruggedness of construction and certainty of operation.

I employ two thermostatic elements in combination with a bowed or arched spring member adapted to change its shape abruptly when subjected to sufficient external force. The thermostatic elements are so arranged in relation to the tensioned spring member, that one of the elements under the action of heat exerts increasing pressure on the spring member until the latter suddenly snaps into a position of reverse curvature. Upon cooling, the other element automatically snaps the spring member back to initial position. These sudden changes of position of the bowed spring member can be utilized to make and break an electric circuit abruptly and therefore without the injurious arcing that occurs in prior thermostats where the contacts are separated slowly.

The basic concept of my invention may be mechanically embodied in various forms. In the accompanying drawings, where I have shown several examples of my invention, Figs. 1 and 2 illustrate an electric thermostat constructed in accordance with my invention, Fig. 1 showing the parts in normal position when the circuit is closed, and Fig. 2 showing the parts in position when the circuit is open;

Fig. 7 illustrates another modification, in which a pair of arched thermostatic elements act upon a transversely arranged spring member;

Fig. 8 shows a cross-section on line 8—8 of Fig. 7, the parts being in circuit-closing position, and Figs. 9 and 10 illustrate another form of my invention, in which the thermostatic elements are arranged in axial alignment with a bowed spring member between them, Fig. 9 showing the parts in circuit-closing position and Fig. 10 in circuit-breaking position.

It is hardly necessary to explain that the drawings are largely diagrammatic, no effort having been made to represent the various parts in correct mechanical proportions. The dimensions of the different parts have been purposely exaggerated in order to make the views as simple and clear as possible. The actual devices are made very compact.

Figure 1:
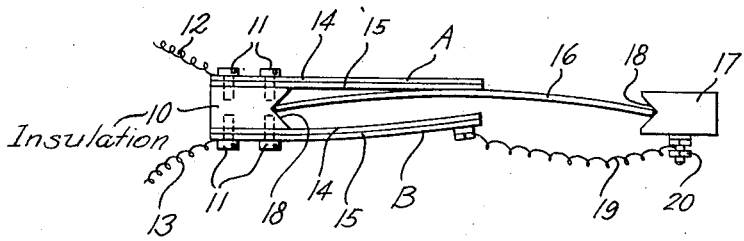
Figure 2:
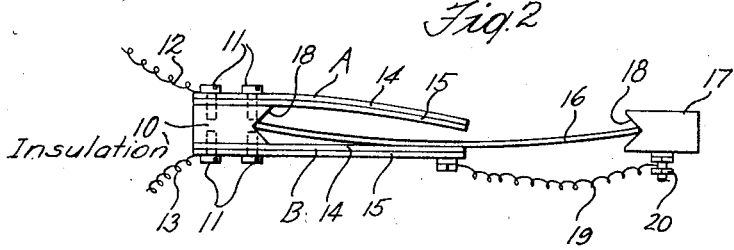
Figure 3:
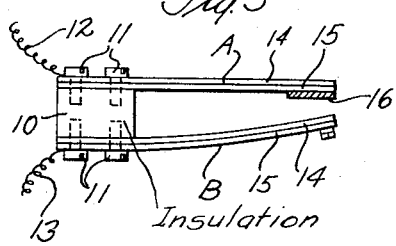
Figs. 3–6 show a slightly modified form in which the bowed spring member is arranged at right angles to the thermostatic elements, Figs. 3 and 4 showing the parts in normal or circuit-closing position, and Figs. 5 and 6 showing the position of the parts when the circuit is broken.
Figure 4:
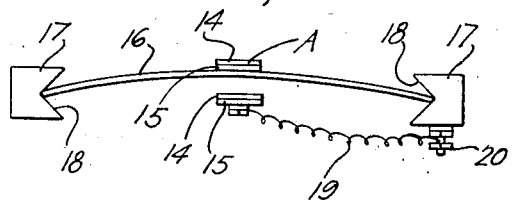
Figure 5:
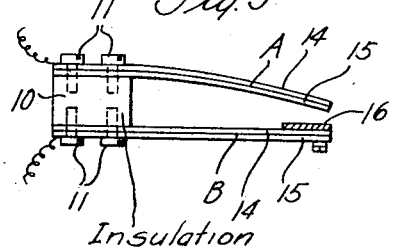
Figure 6:
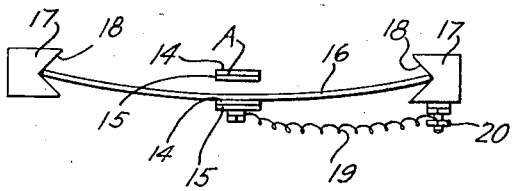

Referring to Figs. 1 and 2, A and B are thermostatic elements rigidly mounted at one end on a suitable base 10, as by means of screws or bolts 11. The base 10 may be a block of insulating material. Two of the screws 11 may conveniently serve as binding posts for conductors 12 and 13 to connect the elements A and B in circuit. These thermostatic elements may be of the usual bimetallic construction, comprising a brass strip 14 and an iron strip 15. These strips are secured together over their entire length to form a rigid bar capable of changing its shape under predetermined variations of temperature. Any other suitable construction of thermostatic element may be employed. Between the elements A and B is mounted a bowed or arched spring member 16, which may be a strip or diaphragm of elastic metal or alloy adapted to change its shape abruptly under the action of external force. For the sake of simplicity in the drawings, I have shown the member 16 as a strip or leaf spring held in bowed shape under tension between the block 10 and a fixed support 17. A simple way of mounting the spring member 16 is to insert the ends thereof in angular recesses 18 in supporting blocks 10 and 17. If the member 16 is a bowed or dished diaphragm of elastic sheet metal, an annular support is provided for engaging the diaphragm at its circumferential edge, as will be understood without illustration. The free end of thermostat bar B is electrically connected by a conductor 19 to a binding post 20 on block 17. It is here assumed that block 17 is of metal. If it is made of insulating material, a suitable electrical connection is established between the bowed spring member 16 and the free end of element B. The conductor 19 is therefore to be considered as representing diagrammatically an electrical connection between the parts 16 and B of the thermostat.

The operation of the construction above described is as follows: As long as the parts are in the normal position illustrated in Fig. 1, the circuit is closed through conductor 12, thermostatic element A, spring member 16, conductor 19, thermostatic element B and conductor 13. The elements A and B are so designed that, when they reach a certain temperature, they begin to move downwardly (as viewed in Figs. 1 and 2), except that element A is temporarily held back by the mechanical resistance of the tensioned spring 16, while the element B is free to move away from the spring. As the free end of element A moves or tends to move down, it exerts pressure on the bowed spring member 16 at or near the center thereof. As the pressure of the heating element A on the tensioned member 16 increases, a point is reached when the latter suddenly snaps into a position of reverse curvature, as illustrated in Fig. 2. This movement of member 16 takes place very abruptly, and therefore breaks the electric circuit so quickly that no arcing (or practically none) takes place. The downward movement of element B moves the free end of element B out of the path of contact member 16, so that the latter is free to snap into circuit-breaking position. It is immaterial whether the parts 16 and B are in or out of contact with each other when the part 16 snaps into circuit-breaking position, because the circuit remains open as long as the member 16 is out of contact with thermostatic element A. The temperature at which the circuit-breaking operation of the parts takes place may be predetermined by properly designing the parts. The conditions of use determine the temperature at which the circuit shall be broken. The contact member 16 remains in circuit-opening position until snapped out of it by element B, as will now be explained.

The circuit is automatically closed again in the following manner: As the thermostat bars A and B begin to cool, they tend to resume their original shape and their free ends move upwardly (as viewed in Fig. 2), except in so far as the bar B is temporarily resisted by the spring member 16. This means that thermostat bar B presses against the bowed spring member 16 until the latter reaches such a condition of tension that it automatically snaps back to initial position, as shown in Fig. 1. While the free end of thermostatic element B is pushing upwardly against the tensioned member 16, the free end of element A is moving upwardly out of the path of that member, so that the latter is free to move suddenly into circuit-closing position.

The modification shown in Figs. 3–6 differs from the structure of Figs. 1 and 2 merely in having the bowed spring member 16 mounted transversely of the thermostatic elements A and B between a pair of fixed supports 17. Otherwise, what has been said concerning Figs. 1 and 2 is fully applicable to Figs. 3–6 without the need of repetition. The construction of Figs. 1 and 2 is probably to be preferred over that of Figs. 3–6 on account of its compactness, owing to the fact that the three movable parts are mounted in axial alignment.

In Figs. 7 and 8, the bowed spring member 16 is supported transversely between a pair of arched thermostatic elements A′ and B′, which are mounted at their ends on insulating blocks 20 and 21. One end of each element A′ and B′ is rigidly secured to block 20, as by screws 22, but the other end is free to slide on block 21 under the action of increasing and decreasing temperatures. To permit this sliding movement each element is provided with an axial slot 23 in which engages a bolt or headed pin 24 mounted in block 21. The elements A′ and B′ are bowed or arched at the middle and so constructed that under the action of increasing temperature the arched portions straighten out, as roughly indicated by dotted lines $a'$ and $b'$. For this purpose, the strip 14′ of each element is made of brass, and the strip 15′ of iron, or equivalent metals. The straightening of the arched element A′ and B′ under heat is permitted by the slidable ends. As the two thermostatic elements move downwardly upon reaching a predetermined high temperature, the upper element A′ pushes down on the spring member 16 until the latter suddenly snaps into a position of reverse curvature, precisely as explained in connection with Figs. 1 and 2. This reverse position is roughly indicated in Fig. 7 by the dotted outline 16′. Since the lower thermostatic element B′ moves downwardly at the same time, it does not interfere with the downward movement of member 16 into circuit-breaking position. As the elements A′ and B′ begin to cool, they gradually resume their original bowed or arched shape by moving upwardly. During this upward movement, the element B′ pushes against the spring member 16 until the latter suddenly snaps into initial circuit-closing position against element A′. Although I have shown both ends of the thermostat elements A′ and B′ connected in circuit by conductors 25 and 26 branching off from leads 27 and 28, this double connection is obviously not necessary, since it is sufficient to connect the parts A′, 16 and B′ in series at one point only. Therefore, only one conductor 29 need be used for connecting the spring member 16 to either end of thermostatic element B'. The bolts 22 and 24 may conveniently be used as binding posts.

In Figs. 9 and 10 there is a pair of thermostatic elements $A^2$ and $B^2$ arranged in axial alignment. The element $A^2$ is supported at its ends on a pair of posts or brackets 30 and 31. One end of element $A^2$ is fixed to post 30 by a screw or bolt 32, which may also act as a binding post for conductor 33. The other end of element $A^2$ is provided with a longitudinal slot 34 in which engages a headed bolt or pin 35 to allow sliding movement of the element under changes of temperature. The thermostatic element $B^2$ is fixed at one end on a support 36, as by means of a bolt or screw 37, which may also serve as a binding post for conductor 38. The other end of element $B^2$ is slidably supported on a post 39, which carries a bolt or headed pin 40 arranged to engage in an axial slot 41 of element $B^2$. The elements $A^2$ and $B^2$ are so constructed that the normal shape of $A^2$ is arched or bowed at the center, as shown in Fig. 9, while the normal shape of $B^2$ is substantially straight or flat. Assuming that these elements are made of the usual combination of brass and iron strips rigidly secured together, the element $A^2$ is so constructed that the inside strip 42 is of brass, while in element $B^2$ the brass strip 43 is on the outside.

Between the thermostatic elements $A^2$ and $B^2$ is mounted the tensioned spring member 16, which is so arched that normally it lies in firm contact with the free end of element $A^2$. A conductor 44 connects the strip or diaphragm 16 with the binding post 40 of element $B^2$, so that normally the parts $A^2$, 16 and $B^2$ are electrically connected in series as long as the parts $A^2$ and 16 are in contact. This series connection is manifestly not necessary, for it is sufficient to control the circuit by the engagement and disengagement of element $A^2$ or $B^2$ with spring member 16, leaving the other thermostatic element out of circuit. When the thermostatic elements $A^2$ and $B^2$ have reached a predetermined temperature, they begin to change their shape under the action of heat. The arched element $A^2$ tends to straighten out by pushing its free end toward the right (as viewed in Fig. 9) against the bowed spring member 16. At the same time, the thermostatic element $B^2$ tends to arch itself into the position shown in Fig. 10, and that causes the free end of that element to move toward the right, away from the spring member 16. As the forwardly moving end of element $A^2$ continues to push against the spring member 16, the latter suddenly snaps into a position of reverse curvature, as shown in Fig. 10. The electric circuit is now broken, and the thermostatic elements $A^2$ and $B^2$ begin to cool until they resume their original shape. As the cooling element $B^2$ pushes its free end toward the left, it exerts increasing pressure against the spring member 16 until the latter suddenly snaps back into initial position in contact with element $A^2$. By the time the contact member 16 is ready to spring back to initial position, the receding end of thermostat element $A^2$ has moved sufficiently out of the way to permit member 16 to resume its normal shape. It will be seen from this description that the adjacent free ends of elements $A^2$ and $B^2$ always move in the same direction to snap the interposed member 16 back and forth from one position to the other. This operation of closing and breaking the circuit at predetermined temperatures is entirely automatic, and this applies to all the other modifications previously described.

In the construction of Figs. 9 and 10, it will be observed that the thermostatic movements of elements $A^2$ and $B^2$ are positively limited by the slotted connections 34—35 and 40—41, respectively. The practical advantage of this feature is that the thermostatic elements are stopped from continuing their movements under the action of internal strains after the circuit has been suddenly opened or closed by the snap action of spring member 16. To make this clear, let us suppose that the spring member in Fig. 9 has just been snapped back into contact with element $A^2$ by the cooling element $B^2$. Now, if there should be any residual strains in elements $A^2$ tending to curve it beyond its normal position and so move its slidable end away from spring member 16, somewhat like the momentum of a moving part, this extra movement of element $A^2$ during cooling is positively prevented by the end of slot 34 engaging bolt 35. In this way the closing of the circuit is assured the moment when the cooling element $B^2$ snaps the spring member 16 into contact with the element $A^2$. When the circuit is abruptly broken by the snap action of spring member 16 under pressure of element $A^2$, the latter is positively prevented from following the reversely curved spring member by the slot and bolt arrangement 34—35, so that there is no danger of the circuit being accidentally closed until the parts are back to normal position.

Attention is called to the fact that the bowed spring member 16 in Figs. 1–10 is not a thermostatic member of bimetallic construction, but is a simple elastic strip or disk of metal or an alloy inherently unresponsive to changes of temperature. Its abrupt change of shape is caused by the action of external force exerted alternately by the thermostatic elements A and B. Whatever expansion and contraction may occur in the length of member 16 on account of temperature variations, they do not affect the automatic operation of the thermostat.

It will now be understood that I have provided a thermostat of exceedingly simple and rugged construction for automatically making and breaking an electric circuit by an abrupt positive movement of a contact member, so that no destructive arcing takes place at the contact points. The three moving parts which comprise my new thermostat are easy to make and assemble. They can be arranged so compactly as to be readily inserted in a small space in such electrical appliances as flat irons, heating pads, toasters, and so on. The constructions herein set forth are not to be regarded as limitations of my invention, which may be embodied in various other ways without departing from the scope of the invention as defined in the following claims.

I claim as my invention:

1. The combination of a buckling spring and a pair of thermostatic elements adapted to move in the same direction when the temperature changes and arranged in opposed relation to said spring to snap the same back and forth at predetermined high and low temperatures.

2. A thermostat comprising a bowed spring member held under tension and adapted to change its shape abruptly by external pressure, thermostatic means for snapping said member into a position of reverse curvature when said means reaches a predetermined high temperature, and separate thermostatic means for snapping said member back to initial position when said last named means reaches a predetermined low temperature, said two thermostatic means being adapted to move in the same direction when the temperature changes.

3. A thermostat comprising a bowed spring member held under tension and adapted to change its shape abruptly by external pressure, a thermostatic element movable under the action of heat to press against said bowed spring member until the latter snaps into a position of reverse curvature, said member remaining in operated position, a second thermostatic element adapted upon cooling to press against said member in an opposite direction until the latter snaps back to initial position, said thermostatic elements being adapted to move in the same direction when the temperature changes and stops for limiting the thermostatic movements of said first-mentioned element.

4. A thermostat comprising a bowed spring member adapted to change its shape abruptly by eternal force, a thermostat bar normally engaging said spring member, said bar on reaching a predetermined high temperature being adapted to exert pressure on said spring member until the latter snaps into a position of reverse curvature out of contact with said bar, temperature-controlled means for snapping said spring member back to initial position into contact with said bar, and means for preventing said bar after each snap-over operation from moving into or out of untimely contact with said spring member.

5. The combination of a pair of spaced thermostat bars rigidly supported at one end, said bars being adapted to move in the same direction when the temperature changes, and movable at the other end, and a buckling spring projecting at the center between said bars which snap said spring back and forth at predetermined high and low temperatures.

6. A normally curved thermostat bar rigidly supported at one end, means for slidably supporting the other end of said bar, which straightens itself on heating by moving its slidable end, a buckling spring adapted to be snapped into reverse curvature by the straightening movement of said bar, said bar and said spring being mechanically disconnected, and means for snapping said spring back to initial position at certain low temperature.

7. The combination of a pair of normally curved thermostat bars rigidly supported at one end, means for slidably supporting the other end of each bar, said bars at high temperature tending to straighten themselves by moving their slidable ends, and a buckling spring projecting at the center between said bars which snap said spring back and forth at predetermined high and low temperatures.

8. The combination of a thermostat bar rigidly supported at one end, means for slidably supporting the other end of said bar, whereby the same alters its shape under changes of temperature by moving said slidable end, a bowed spring member adapted to be snapped into reverse curvature by the movement of said bar at certain high temperature, and a second thermostat bar for snapping said spring member back to initial position at certain low temperature.

9. The combination of a thermostat bar rigidly supported at one end, means for slidably supporting the other end of said bar, whereby the same alters its shape under changes of temperature by moving said slidable end, a bowed spring member adapted to be snapped into reverse curvature by the movement of said bar at certain high temperature, said bar being so arranged that it exerts pressure against the center of said spring member substantially in the direction of movement thereof, and means for snapping said spring member back to initial position at certain low temperature.

ADOLPH A. THOMAS.